(12) United States Patent
Meierling

(10) Patent No.: US 10,814,782 B2
(45) Date of Patent: Oct. 27, 2020

(54) OPERATING DEVICE FOR A MOTOR VEHICLE, MOTOR VEHICLE COMPRISING AN OPERATING DEVICE AND METHOD FOR OPERATING AN OPERATING DEVICE

(71) Applicant: Volkswagen Aktiengesellschaft, Wolfsburg (DE)

(72) Inventor: Klaus Meierling, Bochum (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/524,509

(22) Filed: Jul. 29, 2019

(65) Prior Publication Data

US 2020/0031275 A1   Jan. 30, 2020

(30) Foreign Application Priority Data

Jul. 27, 2018 (DE) .......................... 10 2018 212 618

(51) Int. Cl.
*B60Q 9/00* (2006.01)
*G08B 6/00* (2006.01)

(52) U.S. Cl.
CPC ................ *B60Q 9/00* (2013.01); *G08B 6/00* (2013.01)

(58) Field of Classification Search
CPC ..................................... B60Q 9/00; G08B 6/00
(Continued)

(56) References Cited

U.S. PATENT DOCUMENTS

| 2003/0067245 A1 | 4/2003 | Pelrine et al. ................. 310/311 |
| 2007/0102275 A1 * | 5/2007 | Genz ....................... H01H 13/06 200/406 |

(Continued)

FOREIGN PATENT DOCUMENTS

| DE | 102014219316 A1 | 3/1916 | ............. H01H 13/26 |
| DE | 102010026910 A1 | 8/2011 | ............. B60R 16/02 |
| WO | 2014/093741 A1 | 6/2014 | ............... G06F 3/01 |

OTHER PUBLICATIONS

European Office Action, Application No. 19174868.0, 8 pages, dated Nov. 6, 2019.
(Continued)

*Primary Examiner* — Ojiako K Nwugo
(74) *Attorney, Agent, or Firm* — Slayden Grubert Beard PLLC

(57) ABSTRACT

The invention relates to an operating device for a motor vehicle, comprising an operating element, which can be lowered by application of force; a snap dome arranged below the operating element for applying haptic feedback to the operating element when the snap dome is deformed by means of the operating element lowering; a blocking body made of an electroactive polymer arranged below the operating element and next to the snap dome, the shape of which blocking body can be altered depending on an electrical voltage applied thereto such that lowering of the operating element is blocked or lowering of the operating element for deforming the snap dome is enabled; a detection apparatus for detecting a contact position of a finger on the operating element; a control apparatus which is set up to adjust a voltage at the blocking body depending on the detected contact position of the finger. The invention further relates to a method for operating an operating device and to a motor vehicle comprising an operating device of this kind.

20 Claims, 1 Drawing Sheet

(58) Field of Classification Search
USPC .................................................... 340/425.5
See application file for complete search history.

(56) References Cited

U.S. PATENT DOCUMENTS

| | | | | |
|---|---|---|---|---|
| 2007/0152974 | A1* | 7/2007 | Kim | G06F 3/016 |
| | | | | 345/168 |
| 2010/0079309 | A1 | 4/2010 | Filson et al. | 341/20 |
| 2010/0084249 | A1* | 4/2010 | Bandy | G01B 7/30 |
| | | | | 200/4 |
| 2012/0010529 | A1* | 1/2012 | Chickering, III | |
| | | | | A61B 5/150229 |
| | | | | 600/576 |
| 2012/0262619 | A1* | 10/2012 | Ito | G03B 17/38 |
| | | | | 348/333.01 |

OTHER PUBLICATIONS

German Office Action, Application No. 102018212618.6, 6 pages, dated Mar. 11, 2019.

\* cited by examiner

OPERATING DEVICE FOR A MOTOR VEHICLE, MOTOR VEHICLE COMPRISING AN OPERATING DEVICE AND METHOD FOR OPERATING AN OPERATING DEVICE

CROSS-REFERENCE TO RELATED APPLICATIONS

This application claims priority to German Patent Application No. DE 10 2018 212 618.6, filed on Jul. 27, 2018 with the German Patent and Trademark Office. The contents of the aforesaid Patent Application are incorporated herein for all purposes.

TECHNICAL FIELD

The invention relates to an operating device for a motor vehicle, a motor vehicle comprising an operating device of this kind and a method for operating an operating device of this kind.

It is known per se to provide operating elements, for example in the form of keys or the like, at which haptic feedback can be generated.

For example, US 2007/0152974 A1 discloses a button at which haptic feedback can be generated. An electroactive polymer is arranged below the button, a metal dome in turn being arranged below the electroactive polymer such that click-like haptic feedback can be produced upon actuation of the button. On account of the electroactive polymer, artificial rigidity can be added to the rigidity of the metal dome in order to affect the haptic feedback at the button.

DE 2014 219 316 A1 illustrates an operating element under which a snap dome is arranged. If the operating element has been moved sufficiently toward the snap dome, said operating element causes a spontaneous deformation of the snap dome, as a result of which two contacts are contacted with one another.

SUMMARY

An object of the present invention is to provide a solution by means of which generation of haptic feedback at an operating element can be controlled in a particularly simple manner.

The object is solved by means of an operating device for a motor vehicle and by means of a method for operating an operating device of this kind comprising the features of the independent claims. Embodiments of the invention are provided in the dependent claims and the following discussion.

In one aspect, an operating device for a motor vehicle is provided. The operating device comprises an operating element which can be lowered by application of force; a snap dome arranged below the operating element for applying haptic feedback to the operating element when the snap dome is deformed by means of lowering the operating element; and a blocking body made of an electroactive polymer arranged below the operating element and next to the snap dome, the shape of which blocking body can be altered depending on an electrical voltage applied thereto such that lowering of the operating element is blocked or lowering of the operating element for deforming the snap dome is enabled. The operating device further comprises a detection apparatus for detecting a contact position of a finger on the operating element; and a control apparatus which is configured to adjust a voltage at the blocking body depending on the detected contact position of the finger.

The details of one or more embodiments are set forth in the accompanying drawings and the description below. Other features will be apparent from the description, drawings, and from the claims.

DETAILED DESCRIPTION

Figure 1:
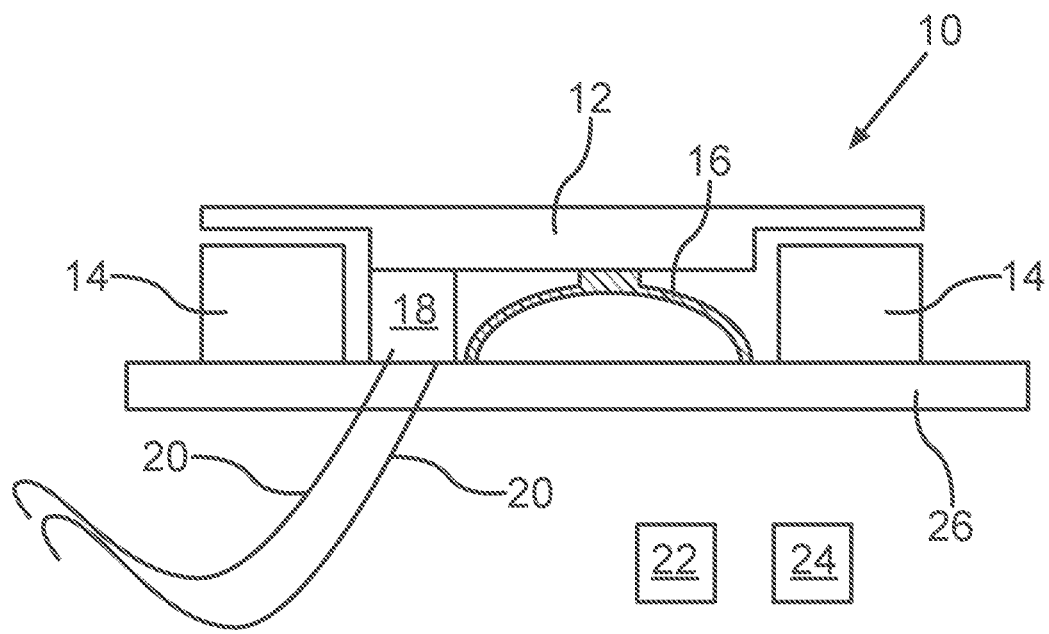
FIG. 1 is a schematic representation of an operating device for a motor vehicle, which operating device has an operating element that can be lowered by application of force, a snap dome for applying haptic feedback being provided below the operating element, and a blocking body for blocking a lowering movement of the operating element being provided next to said snap dome, which blocking body blocks lowering of the operating element.

In one exemplary aspect, an operating device for a motor vehicle comprises an operating element, which can be lowered by application of force. The operating device also comprises a snap dome arranged below the operating element for applying haptic feedback to the operating element when the snap dome is deformed by means of the operating element lowering. A snap dome of this kind is typically also referred to as a tactile dome. The snap dome may for example consist of spring steel, the spring steel being embossed such that it has a stable and a metastable state. When force is applied, the spring steel deforms until it suddenly goes through the metastable state by means of buckling. The sudden mode jump at this point usually produces a clearly audible popping sound. If the force ceases to be applied, the metal snaps back, which again produces a loud pop. By means of the snap dome, it is therefore possible to generate haptic and acoustic feedback at the operating element if the operating element is lowered far enough to deform the snap dome arranged thereunder by means of corresponding application of force. In addition, the snap dome also generates haptic and acoustic feedback if the force ceases to be applied to the operating element, as a result of which the operating element, for example also supported by a return spring, returns to its original position. In the process, the snap dome changes back into its original, stable shape.

In addition to the above and according to the present aspect, a blocking body made of an electroactive polymer is arranged below the operating element and next to the snap dome, the shape of which blocking body can be altered depending on an electrical voltage applied thereto such that lowering of the operating element is blocked or lowering of the operating element for deforming the snap dome is enabled. Therefore, depending on how voltage is applied to the blocking body, said blocking body either has such a shape that the blocking body blocks lowering of the operating element, i.e., the operating element cannot be lowered, or there is enough room between the blocking body and the operating element such that, in order to deform the snap dome, the operating element can be lowered towards the snap dome and by doing so, the snap dome deforms.

Furthermore, the operating device of the present aspect comprises a detection apparatus for detecting a contact position of a finger on the operating element as well as a control apparatus, which is configured to adjust a voltage at the blocking body depending on the detected contact position of the finger.

By means of the blocking body, it is therefore possible, by applying a corresponding voltage or omitting the electrical voltage altogether, to give the operating element, which may be a key cap for example, enough space such that the snap dome located there below, which snap dome may also be understood as a tactile dome, can be made to collapse by means of the operating element and thus produce a corresponding switching sensation. By means of the detection apparatus, it is possible to detect a relevant contact position of a finger of a user on the operating element, the control apparatus being able to impress a corresponding voltage on the blocking body or to remove the voltage entirely, depending on the contact position detected, in order to either enable or prevent lowering of the operating element and thus deformation of the snap dome.

This way, an operating device having a particularly simple design is provided for a motor vehicle, by means of which operating device the generation of haptic feedback at the operating element can be controlled in a particularly simple manner depending on a detected contact position of a finger on the operating element.

In some embodiments, the shape of the blocking body enables lowering of the operating element for deformation of the snap dome when a voltage is applied, and blocks lowering of the operating element when no voltage is applied. In other words, a certain voltage is impressed on or applied to the blocking body in order for it to contract so far relative to an actuation direction or lowering direction of the operating element that enough space is created between the blocking body and the operating element for it to be possible to lower the operating element towards the snap dome. If no voltage is applied or impressed, the shape of the blocking body is such that it abuts directly against the operating element from below and therefore prevents the operating element from being lowered. A benefit of this is that, in the voltage-free and thus current-free state, it can always be ensured that the blocking body reliably prevents lowering of the operating element. It is therefore not necessary to permanently apply a voltage to the blocking body such that it prevents lowering of the operating element.

In some embodiments, the operating element has at least one symbol, and the control apparatus is configured to only adjust the voltage accordingly in order to enable lowering of the operating element if the finger touches said symbol. As already mentioned in the preceding, the operating element may be a pushbutton or a key, it being possible for the symbol to be provided on the operating element in the form of permanent paint or another permanent marking, for example. It is also possible for the operating element to be a touch-sensitive display apparatus, for example, such as a touchscreen or the like, it being possible in this case for the at least one symbol to be displayed on the screen. Because the control apparatus is set up to only adjust the voltage at the blocking body accordingly in order to allow lowering of the operating element if the finger touches the symbol, it can be ensured that a function associated with actuation of the operating element is only triggered if the relevant user is touching the symbol with their finger. If, for example, a user touches the operating element with their finger at another point where said symbol is not present, false triggering of functions and thus also accompanying feedback from the snap dome can be prevented.

In some embodiments, the operating element has at least two symbols, the control apparatus being set up to impress the voltage on the blocking body in an oscillating manner in order to cause the operating element to vibrate if the finger is detected to be between the symbols. If an oscillating voltage is applied to the blocking body, this causes the blocking body to expand and contract accordingly in an oscillating manner, as a result of which a vibration is induced at the operating element, which can be felt by a user with their finger. The voltage may in some embodiments be high enough and only oscillate fast enough such that the user cannot press the operating element down far enough to deform the snap dome. This way, it can be signaled to the user in a simple manner that they have not touched either of the two symbols with their finger. As a result, false triggering of functions assigned to the symbols can be prevented. This is because the user is encouraged to place their finger precisely on one of the two symbols before lowering the operating element at the relevant point towards the snap dome.

In some embodiments, the detection apparatus is designed to detect the contact position of the finger on the operating element capacitively. As a result, it is particularly simple to achieve reliable and precise detection of the contact position of the finger on the operating element.

In some embodiments, in addition to the blocking body already mentioned, the detection apparatus also has two more blocking bodies of the same kind, all three blocking bodies abutting against the underside of the operating element when no voltage is applied and, when force is applied to the operating element, generating a voltage, the control apparatus being configured to detect the contact position of the finger on the operating element by means of triangulation using the voltages generated. This way, it is possible to detect the respective contact positions of fingers on the operating element by means of the blocking bodies and control apparatus alone. In this case, it would also be possible, for example, to determine the contact position of the finger on the operating element without using any other sensors, for example capacitive sensors, pressure sensors, or the like.

In some embodiments, the blocking body has a resilient and electrically insulating silicone body, which is arranged between two electrically conductive silicone elastomer layers that act as electrodes. A voltage can be easily applied to the latter, as a result of which the two silicone elastomer layers are attracted to one another and compress the resilient, electrically insulating silicone body therebetween. In other words, the blocking body therefore forms a kind of deformable capacitor, the shape of which can be altered very easily by means of corresponding application of voltage or removal of voltage.

In another aspect, a motor vehicle comprises the operating device as discussed in the preceding, i.e., according to the first aspect or one or more particular embodiments of the operating device according to the first aspect.

In another aspect, a method for operating the operating device according to the first aspect or one or more particular embodiments of the operating device according to the first aspect, is provided. In some embodiments, a voltage at the blocking body is adjusted by means of the control apparatus depending on a contact position of the finger detected by means of the detection apparatus in order to block lowering of the operating element or enable lowering of the operating element for deforming the snap dome. The embodiments of the operating device discussed with reference to the first aspect are considered beneficial for the method according to the present aspect and vice versa and can be applied accordingly. In some embodiments, the operating device comprises means for carrying out the method steps.

Additional advantages, features, and details of the invention are apparent from the following description of further exemplary embodiments, which are discussed with reference to the drawings. The features and combinations of features discussed in the description above and the features and combinations of features presented in the description of the FIGS. below and/or in the FIGS. themselves can be used not only in the relevant combination described, but also in other combinations or in isolation without departing from the scope of the invention.

In the FIGS., identical or functionally identical elements have been provided with the same reference numbers.

An operating device 10 for a motor vehicle (not shown here) is shown in a schematic side view in FIG. 1. The operating device 10 comprises an operating element 12 which can be lowered by application of force. The operating element 12 may for example be a key on a center console of the motor vehicle or any other type of key at other points in the vehicle interior of the motor vehicle.

The operating element 12 is guided and mounted by means of corresponding guides 14 such that the operating element 12 can be lowered downward in a translational manner from the position shown here in that a corresponding force is exerted from above on the operating element 12 by means of one or more fingers. A snap dome 16 is additionally arranged below the operating element 12, which snap dome is curved upward, i.e., toward the operating element 12, in the manner of a cupola or dome in the mechanically unloaded state.

The snap dome 16 abuts directly against the underside of the operating element 12. Additionally, a blocking body 18 made of an electroactive polymer is also arranged below the operating element 12 and next to the snap dome 16. The shape of the blocking body 18 can be altered depending on an electrical voltage applied thereto such that lowering of the operating element 12 is blocked or lowering of the operating element 12 for deforming the snap dome 16 is enabled. Two wires 20 are also shown schematically in the present FIG., which wires are connected to the blocking body 18 in an electrically conductive manner such that an electrical voltage can be applied to the blocking body 18 by means of said wires.

The operating device 10 also comprises a detection apparatus 22 (merely indicated schematically here) for detecting a contact position of a finger on the operating element 12. By means of the detection apparatus 22, it can in particular be determined where a user touches an upper face of the operating element 12 remote from the snap dome 16 with their finger. Furthermore, the operating device 10 comprises a control apparatus 24, which is set up to adjust a voltage at the blocking body 18 depending on a contact position of the finger currently detected by means of the detection apparatus 22.

The blocking body 18 may for example have a resilient, electrically insulating silicone body (not shown here in greater detail) which is arranged between two electrically conductive silicone elastomer layers that act as electrodes. The latter are then connected to the respective wires 20 in an electrically conductive manner. If a voltage is applied to the electrically conductive silicone elastomer layers, the silicone elastomer layers acting as electrodes are attracted to one another, as a result of which the silicone body arranged therebetween is compressed.

In the exemplary embodiment described here, the blocking body 18 has the shape shown here when no voltage is applied, there being no gap between the blocking body 18 and the operating element 12.

In other words, the blocking body 18 abuts against the underside of the operating element 12 when no voltage is applied and therefore prevents lowering of the operating element 12. As soon as a voltage is applied to the blocking body 18, the blocking body contracts such that a space forms between the blocking body and the operating element 12, as a result of which the operating element 12 can be lowered towards the snap dome 16.

Figure 2:
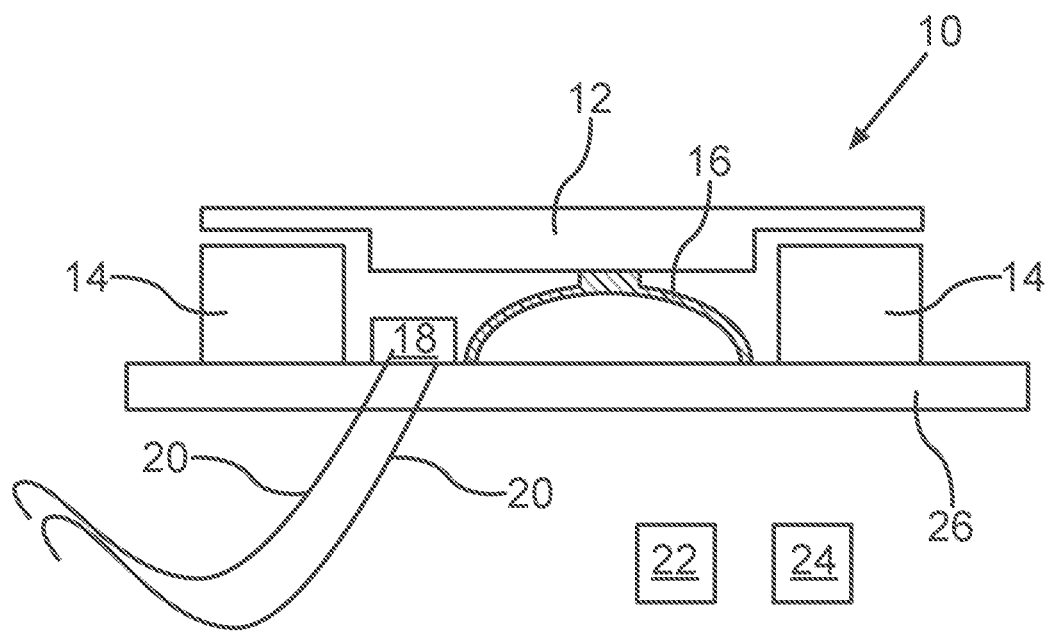
FIG. 2 is another schematic representation of the operating device, the blocking body being deformed by application of an electrical voltage thereto such that the operating element can be lowered towards the snap dome.

In FIG. 2, the operating device 10 is shown in an additional schematic side view, a voltage having been applied to the blocking body 18, as a result of which said blocking body has been compressed to such an extent that the operating element 12 can now be lowered towards the snap dome 16. The two guides 14, the snap dome 16 and the blocking body 18 may for example be arranged on a support 26 in the shape of a plate or the like. The snap dome 16 and the blocking body 18 are therefore supported from below. If the operating element 12 is pressed downward far enough, the snap dome 16 deforms until it inverts by means of buckling and takes on a metastable state. A sudden mode jump into this metastable state occurs, which produces a loud popping sound. If the force ceases to be applied, the snap dome 16 snaps back into the stable shape shown here, a loud pop again being produced. Haptic and acoustic feedback can therefore be generated by means of the snap dome 16, both when the operating element 12 is pressed down and again when the operating element 12 is released. The snap dome 16 by itself can ensure that the operating element 12 is pushed back upward when released. It is also possible for this procedure to be assisted by means of a return spring (not shown here) that exerts a force upward on the operating element 12.

The operating element 12 may for example have a symbol which indicates a function that can be triggered by means of actuation of the operating element 12. The control apparatus 24 is set up to only adjust the voltage at the blocking body 18 accordingly in order to allow lowering of the operating element 12 if the finger is touching the symbol. If this is not the case, the operating element 12 is prevented from being pressed down. False triggering of functions assigned to the relevant symbol can therefore be prevented if a user attempts to press the operating element 12 down but is not touching the symbol.

It is also possible for the operating element 12 to have two symbols, for example, it being possible for the control apparatus 24 to be set up to impress the voltage on the blocking body 18 in an oscillating manner in order to cause the operating element 12 to vibrate if the finger of a user is detected to be between the symbols. This way, it can be signaled to a user in a simple manner that they are not touching either of the two symbols correctly with their finger. As a result, false triggering of functions assigned to the symbols can be prevented, since the user is immediately made aware of the fact that they have not selected or touched either of the symbols correctly.

The detection apparatus 22 may for example detect the contact position of the finger on the operating element 12 in a capacitive manner. Alternatively or additionally, it is also possible for the detection apparatus 22 to also have two more blocking bodies of the same kind, in addition to the blocking body 18 shown here, all three blocking bodies 18 abutting against the underside of the operating element 12 when no voltage is applied and, when force is applied to the operating element 12, i.e., when the blocking bodies are compressed, generating a voltage.

The control apparatus 24 is in this case set up to detect the contact position of the finger on the operating element 12 by means of triangulation using the voltages generated. It is therefore possible to detect a relevant contact position of a finger on the operating element 12 without any additional sensors merely by means of said three blocking bodies 18 and the control apparatus 24, provided that a certain force is applied to the operating element 12.

LIST OF REFERENCE NUMERALS

10 Operating device
12 Operating element
14 Guides for the operating element
16 Snap dome
18 Blocking body
20 Wires
22 Detection apparatus
24 Control apparatus
26 Support The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

The invention claimed is:

1. An operating device for a motor vehicle, comprising an operating element which can be lowered by application of force;
a snap dome arranged below the operating element for applying haptic feedback to the operating element when the snap dome is deformed by means of lowering the operating element;
a blocking body made of an electroactive polymer arranged below the operating element and next to the snap dome, the shape of which blocking body can be altered depending on an electrical voltage applied thereto such that lowering of the operating element is blocked or lowering of the operating element for deforming the snap dome is enabled;
a detection apparatus for detecting a contact position of a finger on the operating element;
a control apparatus which is configured to adjust a voltage at the blocking body depending on the detected contact position of the finger.

2. The operating device according to claim 1, wherein the shape of the blocking body enables lowering of the operating element for deformation of the snap dome when a voltage is applied, and blocks lowering of the operating element when no voltage is applied.

3. The operating device according to claim 2, wherein the operating element has at least one symbol, the control apparatus being set up to only adjust the voltage accordingly in order to enable lowering of the operating element if the finger touches said symbol.

4. The operating device according to claim 2, wherein the operating element has at least two symbols, the control apparatus being set up to apply the voltage to the blocking body in an oscillating manner in order to cause the operating element to vibrate if the finger is detected to be between the symbols.

5. The operating device according to claim 2, wherein the detection apparatus is configured to detect the contact position of the finger on the operating element in a capacitive manner.

6. The operating device according to claim 2, wherein in addition to the blocking body, the detection apparatus comprises two more blocking bodies, wherein all three blocking bodies abutting against the underside of the operating element when no voltage is applied and, when force is applied to the operating element, generating a voltage, the control apparatus being configured to detect the contact position of the finger on the operating element by means of triangulation using the voltages generated.

7. The operating device according to claim 2, wherein the blocking body has a resilient and electrically insulating silicone body which is arranged between two electrically conductive silicone elastomer layers that act as electrodes.

8. The operating device according to claim 1, wherein the operating element has at least one symbol, the control apparatus being set up to only adjust the voltage accordingly in order to enable lowering of the operating element if the finger touches said symbol.

9. The operating device according to claim 8, wherein the operating element has at least two symbols, the control apparatus being set up to apply the voltage to the blocking body in an oscillating manner in order to cause the operating element to vibrate if the finger is detected to be between the symbols.

10. The operating device according to claim 8, wherein the detection apparatus is configured to detect the contact position of the finger on the operating element in a capacitive manner.

11. The operating device according to claim 8, wherein in addition to the blocking body, the detection apparatus comprises two more blocking bodies, wherein all three blocking bodies abutting against the underside of the operating element when no voltage is applied and, when force is applied to the operating element, generating a voltage, the control apparatus being configured to detect the contact position of the finger on the operating element by means of triangulation using the voltages generated.

12. The operating device according to claim 1, wherein the operating element has at least two symbols, the control apparatus being set up to apply the voltage to the blocking body in an oscillating manner in order to cause the operating element to vibrate if the finger is detected to be between the symbols.

13. The operating device according to claim 12, wherein the detection apparatus is configured to detect the contact position of the finger on the operating element in a capacitive manner.

14. The operating device according to claim 12, wherein in addition to the blocking body, the detection apparatus comprises two more blocking bodies, wherein all three blocking bodies abutting against the underside of the operating element when no voltage is applied and, when force is applied to the operating element, generating a voltage, the control apparatus being configured to detect the contact position of the finger on the operating element by means of triangulation using the voltages generated.

15. The operating device according to claim 1, wherein the detection apparatus is configured to detect the contact position of the finger on the operating element in a capacitive manner.

16. The operating device according to claim 15, wherein in addition to the blocking body, the detection apparatus comprises two more blocking bodies, wherein all three blocking bodies abutting against the underside of the operating element when no voltage is applied and, when force is applied to the operating element, generating a voltage, the control apparatus being configured to detect the contact position of the finger on the operating element by means of triangulation using the voltages generated.

17. The operating device according to claim 1, wherein in addition to the blocking body, the detection apparatus comprises two more blocking bodies, wherein all three blocking bodies abutting against the underside of the operating element when no voltage is applied and, when force is applied to the operating element, generating a voltage, the control apparatus being configured to detect the contact position of the finger on the operating element by means of triangulation using the voltages generated.

18. The operating device according to claim 1, wherein the blocking body has a resilient and electrically insulating silicone body which is arranged between two electrically conductive silicone elastomer layers that act as electrodes.

19. A motor vehicle comprising an operating device according to claim 1.

20. A method for operating an operating device according to claim 1, wherein a voltage at the blocking body is adjusted by the control apparatus depending on a contact position of the finger detected by the detection apparatus in order to block lowering of the operating element or enable lowering of the operating element for deforming the snap dome.

* * * * *